Oct. 27, 1953     A. C. ANDERSON     2,656,846
FLOW CONTROL VALVE
Filed Jan. 15, 1953
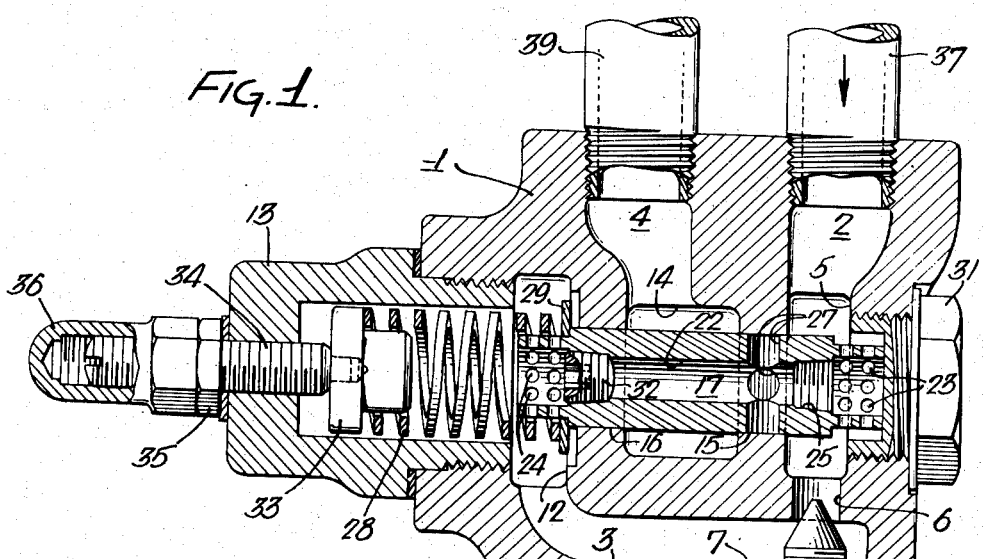
FIG. 1.
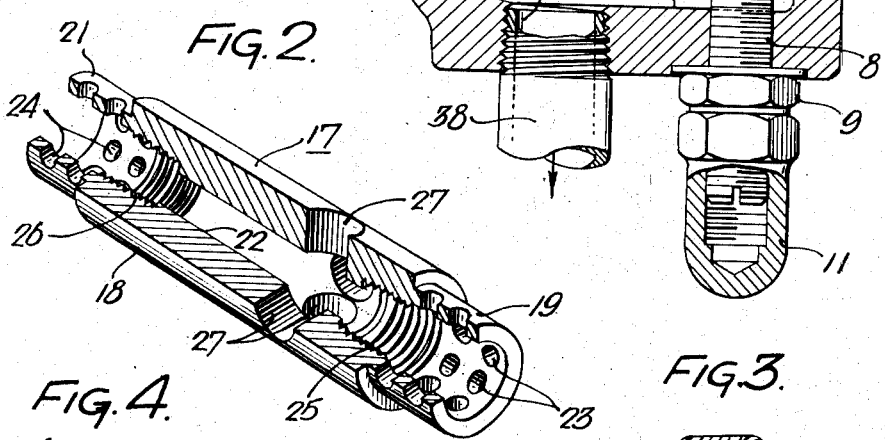
FIG. 2.
FIG. 3.
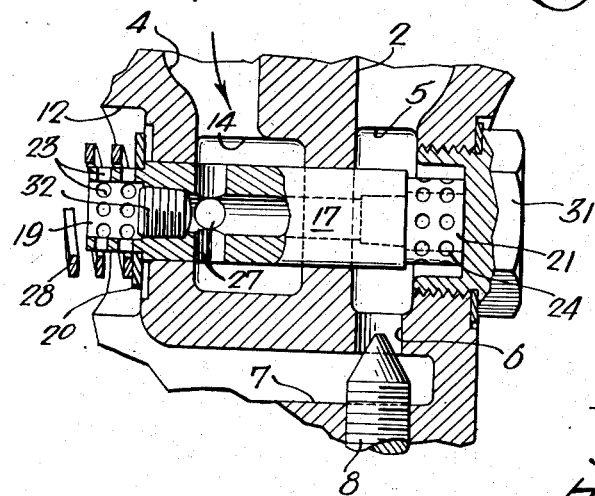
FIG. 4.
Inventor:
Arthur C. Anderson
by his Attorneys
Howson & Howson Patented Oct. 27, 1953

2,656,846

UNITED STATES PATENT OFFICE 2,656,846

FLOW CONTROL VALVE

Arthur C. Anderson, Wildwood Crest, N. J., assignor to A. C. Anderson, Inc., Wildwood, N. J., a corporation of New Jersey Application January 15, 1953, Serial No. 331,348

1 Claim. (Cl. 137—108)

This invention relates to improvements in flow control valves of the type designed to maintain a flow of pressure fluid constant as to volume between a supply source, such as a positive displacement pump, and a hydraulic motor or other fluid-pressure actuated mechanism or apparatus.

A principal object of the invention is to provide a valve of the stated type readily adjustable to afford the different functional and structural characteristics that may be required in the application of the valve to different environments and purposes.

Toward this primary end, the invention contemplates the provision of a valve in which the movable valve element is designed for installation in selectively different positions in each of which it cooperates with the other structure of the valve to afford desired functional characteristics.

The invention will be more readily understood by reference to the attached drawings wherein:

Figure 1 is a sectional view of a valve made in accordance with the invention, said section being taken in a plane containing the longitudinal axis of the movable valve element;

Figure 2 is a sectional perspective view of the valve element removed from the case;

Figure 3 is a view in perspective of a threaded plug constituting an element of the device, and, Figure 4 is a fragmentary sectional view corresponding to Figure 1 but showing the valve element in the reverse or alternative position of operation.

With reference particularly to Figure 1, the valve therein illustrated comprises a casing 1 having three ports designated 2, 3 and 4 respectively. The port 2 connects with a chamber 5 in the casing, and this chamber also connects through an adjustable orifice 6 and passage 7 with the port 3. A plug valve 8 threaded into the wall of the case in operative association with the orifice 6 provides a means for regulating the effective size of this orifice, and in the present instance the valve element 8 is provided at the outside of the casing with a lock nut 9 and with a removable cover element 11.

The passage 7 also communicates with a chamber 12, and that chamber is extended into the interior of a hollow fitting 13 which is threaded into the wall of the casing 1. It will be noted that the chambers 5 and 12 are aligned one with the other.

Intermediate the chambers 5 and 12 is a chamber 14 and this chamber communicates with a port 4. The walls which separate the chamber 14 from the chambers 5 and 12 are provided with cylindrical bores designated 15 and 16 respectively which receive a cylindrical valve element 17, one end of this valve element projecting into the chamber 5, and the other into the chamber 12.

The detailed form of the valve element 17 is best shown in Figure 2. It comprises a cylindrical body portion which terminates at each end in a cylindrical extension, 19 and 21 respectively, of reduced outside diameter. The body portion 18 and the extensions 19 and 21 are perforated, as indicated at 23 and 24, and the internal passage or bore 22 of the body portion 18 of the valve member is provided at each end with internally tapered threads, 25 and 26 respectively. At points adjoining the inner end of the thread 25 the wall of the body portion 18 of the valve member is provided with a circumferential series of apertures 27. Except for the location of the apertures 27 the valve member is symmetrical with respect both to its major and minor axis.

With reference again to Figure 1 it will be noted that the valve member fits neatly and slidably within the bores 15 and 16. A spring 28 within the extension of the chamber 12 seats against a washer 29 at the proximate end of the valve member and exerts pressures tending to retain the said member in the position in which it is shown in the drawing wherein the opposite end of the member seats against the inner face of a plug 31 threaded into the wall of the casing. The interior bore 22 of the valve member is in communication with the chamber 5 by way of the perforations 23 and the bore 22 would, therefore, constitute a bypass between the chambers 5 and 12 were it not for the fact that the left hand end of the bore, as viewed in Figure 1, is stopped by a threaded plug 32. This plug is shown in Figures 1 and 3. By reason of this plug communication between the ports 2 and 3 depends solely on the restricted orifice 6. When the valve is in the position shown in Figure 1 the chamber 14 is segregated from the chambers 5 and 12, from the port 4, and therefore from the ports 2 and 3. Movement of the valve member to the left, as viewed in Figure 1, against the pressure of the spring 28 will, however, eventually bring the apertures 27 into communication with the chamber 14, and will thereby provide a bypass between the chamber 5 and the chamber 14 through the bore 22 of the valve member.

It will be noted that the spring 28 is seated at its outer end upon a member 33, which is adjustably mounted in the fitting 13, and that the position of this member 33 axially of the spring may be regulated by an adjustable screw 34 threaded into the outer end of the fitting and locked into position by a lock nut 35. The outer end of this screw is embraced by a screw cap 36. By adjustment of the screw 34 the pressure of the spring 28 against the end of the valve member 17 may be regulated as required.

Let it be assumed that the port 2 is connected by way of pipe 37 to a source of fluid pressure such, for example, as a positive displacement pump; and that the port 3 is connected by way of a pipe 38 with a hydraulic motor constituting the prime mover of a driven mechanism such, for example, as the sickle bar of a tractor. The port 4 and therefore the chamber 14 may then be connected by a pipe 39 with a sump or reservoir from which actuating liquid is drawn by the pump connected with the pipe 37. It is evident that if the pressure of the spring 28 against the valve member 17 is equal to the difference in the fluid pressures at opposite sides of the orifice 6 (assuming of course that the effective areas of the valve member exposed to the fluid pressures in the chambers 5 and 12 are equal) the valve member will be balanced in the position, for example, in which it is shown in Figure 1. If now the pressure in the chamber 5 increases by reason, for example, of acceleration of the pump connected to the port 2, the resulting increased pressure in the chamber 5 will upset the balance of pressures on the valve member and will force the said member to the left to an extent such that the apertures 15 come into communication with the chamber 14. The excess pressure in the chamber 5 will then be relieved to an extent restoring the original balance, and the flow of liquid through the orifice 6 and through the port 3 to the motor connected to that port will remain substantially constant. If, on the other hand, the back pressure at the port 3 increases by reason of added load on the motor, the resulting pressure rise in the passage 7 will result in a correspondingly increased pressure rise in the chamber 5, and the flow of the liquid through the orifice 6 and through the port 3 will again remain substantially constant. Assuming that the original balance of pressures, as determined by the settings of the valve 8 and spring pressure regulating screw 34, places the valve member 17 in a position of rest wherein the apertures 27 are partially exposed in the chamber 14, then the valve will operate to maintain, within limits, both constant flow and constant pressure at the port 3 regardless of fluctuations either way in the pressure at the port 2. In this case a reduction of pressure in the chamber 5 will be accompanied by a movement of the valve member to the right, diminishing the by-passing flow of fluid to the chamber 14 and thereby effecting an increase of pressure in the chamber 5 to compensate the original pressure loss. Pressure drop at the port 3 will be accompanied by a movement of the valve member to the left and resulting decrease in the pressure in chamber 5. Volume of flow past orifice 6 thereby remains unchanged. Increase of pressure at port 3 will be accompanied by a movement of the valve member to the right and a resulting compensating increase in pressure in the chamber 5. Volume of flow again remains unchanged.

As previously stated the valve member 17 is symmetrical and its position may therefore be reversed in the casing 1 as illustrated in Figure 4. In this case the apertures 27 will, in a normal spring-controlled position of the valve member, communicate with the chamber 14. These apertures lie in immediate proximity to, or will be intersected by, the chamber wall which separates the chamber 14 from the chamber 12. Any movement of the valve member to the left therefore will tend to constrict the outer ends of the apertures and will decrease flow from the chamber 14 to chamber 5 progressively until the apertures 14 are entirely cut off by the casing wall. In this instance the plug 32 is entered into the threads 25 of the valve member instead of in the threads 26 as in the embodiment of Figure 1. In this case also, the port 4 is connected to the pressure source and the port 2 is closed by means of a suitable plug similar to plug 32, replacing the pipe 37 of the previously described embodiment. As in Figure 1 the port 3 is connected to the fluid pressure operated apparatus or mechanism.

In this case the pressure applied at the port 4 and imposed upon the chamber 14 exerts pressure on the valve member 17 tending to shift it to the left as viewed in the drawing. Such movement of the valve member is resisted by the fluid pressure in the chamber 12 and by pressure of the spring 28. The valve is balanced when the pressure spring 28 equals the difference in the pressure at opposite sides of the orifice 6. If this pressure differential is disturbed by increase or decrease of pressure at the port 3, for example, the valve member will be moved to an extent adjusting the effective size of the apertures 27 as may be required to restore the pressure balance. This device may be used to advantage where the fluid pressure source connected to port 4 is constant, such for example as an accumulator.

The invention provides a flow control valve wherein, by simple end to end inversion of the valve member 17 and an accompanying transfer of the plug 32 from one end of the valve member to the other, the valve can be changed characteristically to meet the special requirements of different applications.

I claim:

In a flow control valve, a casing having first and second chambers, a passage including a restricted orifice connecting said chambers, and a third chamber intermediate the chambers first named, said casing having also three ports connected respectively to said chambers, a valve member having its ends exposed respectively in said first and second chambers and intersecting the third chamber and mounted for longitudinal sliding movement in the casing, said valve member having a longitudinal bore extending from end to end thereof and an aperture in the wall thereof located relatively close to one of said ends, a spring exerting pressure on the valve member tending to move the member longitudinally in the casing, means limiting movement of the valve member by pressure of the spring, means for selectively closing the respective ends of the longitudinal bore of the valve member so that a differential in the pressures exerted on the valve member by the fluid in two of said chambers may act in opposition to the spring to control the position of axial adjustment of the member in the casing, said valve member being reversible end for end within the casing, the said chambers being relatively arranged so that in one of the said positions of reversal an endwise movement of the valve member against the spring pressure will progressively increase the effective area of the aperture exposed in the intermediate chamber, and in the other of said positions of reversal a corresponding movement of the member will progressively reduce the effective area of the aperture exposed in said intermediate chamber, and means for closing the said port which is connected to that one of the first and second chambers toward which the valve member is urged by the spring.

ARTHUR C. ANDERSON.

References Cited in the file of this patent

UNITED STATES PATENTS

| Number | Name | Date |
|---|---|---|
| 2,210,295 | Johnson | Aug. 6, 1940 |
| 2,395,941 | Rockwell | Mar. 5, 1946 |
| 2,404,102 | Schultz | July 16, 1946 |